United States Patent Office 3,155,691
Patented Nov. 3, 1964

3,155,691
PRODUCTION OF 17BETA-ALKYL ETHERS OF 16-KETO-17BETA-HYDROXY STEROIDS
Max N. Huffman, Colorado Springs, Colo., assignor to Lasdon Foundation, Inc., Yonkers, N.Y., a corporation of Delaware
No Drawing. Filed Dec. 3, 1962, Ser. No. 243,183
8 Claims. (Cl. 260—397.4)

This invention relates to a novel method of producing 17beta-alkyl ethers of 16-keto-17beta-hydroxysteroids. More particularly, this invention relates to the production of steroids wherein the D ring has the formula

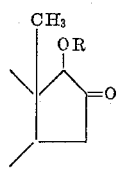

where R is an alkyl radical, from 16-keto-17beta-hydroxysteroids wherein the D ring has the formula

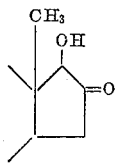

by reaction with an alkyl ester in the presence of alkali.

This application is a continuation-in-part of my copending application Serial No. 27,962, filed May 9, 1960, now Patent No. 3,067,215, which is a continuation-in-part of my prior copending application Serial No. 728,210, filed April 14, 1958, now Patent No. 2,945,048.

The alkylation of phenolic hydroxyl radicals in steroids and related compounds by reaction with dialkyl sulfates and aqueous alkali is well known. However, the production of alkyl ethers of steroids containing hydroxyl radicals on rings which are not aromatic is a different problem from the alkylation of phenolic materials. In light of this knowledge it was surprising to discover that the 17beta-hydroxyl radical of a steroid containing a keto or oxo substituent in the 16-position can be etherified by reaction with a dialkyl sulfate in the presence of alkali.

This procedure is applicable to all steroids whether fully saturated or having one or more aromatic rings or having intermediate stages of unsaturation. In short, the reaction is applicable to cyclopentanophenanthrene compounds wherein the cyclopentano ring has the following structure:

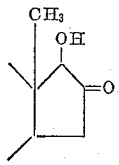

In accordance with this invention the cyclopentanophenanthrene compound having a 16-keto substituent and a 17beta-hydroxy radical is dissolved in a water-miscible organic solvent. Preferable a stoichiometric excess of aqueous alkali is initially added to the solution, although this step is optional. Thereafter a dialkyl sulfate, such as dimethyl sulfate, and an aqueous alkali solution are introduced simultaneously into the reaction mixture pro rata, until substantial excesses of both reagents are present. The reaction mixture of cyclopentanophenanthrene compound and dialkyl sulfate in organic solvent is maintained on the alkaline side throughout the operation, that is, at a pH value in the range of 8 to 14. The reaction mixture is agitated and heated at a temperature in the range of 50° to 150° C. for a period of time ranging from ¼ hour to 3 or more hours. It is important during the reaction that the dialkyl sulfate and the alkali be added at substantially the same rate so that approximately stoichiometric quantities of each reagent are introduced in the same period of time. However, it is not necessary that this rate be absolutely equal for each reagent because reasonable excesses of one reagent do not adversely affect the reaction. The alkyl ether of the 16-keto-17beta-hydroxycyclopentanophenanthrene compound can be removed from the reaction mixture by conventional procedures, such as by precipitation by the addition of water or by evaporation of the organic solvent.

In the present invention the dialkyl sulfate can be dimethyl sulfate, diethyl sulfate or similar dialkyl esters of sulfuric acid wherein the alkyl radicals contain 1 to 5 carbon atoms. The alkali is preferably caustic alkali, such as potassium hydroxide or sodium hydroxide. The organic solvents in which the reaction is conveniently conducted are methanol, ethanol, propanol, isopropanol, acetone, methyl ethyl ketone, dioxane and similar water-miscible organic solvents. These solvents may be used in anhydrous form or diluted with water. The reaction is ordinarily conducted by refluxing the reaction mixture and consequently solvents boiling in the range of 50° to 150° C. are preferred.

Steroids to which the etherification procedure is applicable include cyclopentanophenanthrene compounds having a keto (oxo) substituent in the 16-position and a beta-hydroxyl radical in the 17-position. Rings A, B and C of the cyclopentanophenanthrene nucleus may be saturated or unsaturated and the unsaturated rings may be aromatic or only partially unsaturated. For example, the cyclopentanophenanthrene nucleus may be devoid of double bonds as in androstan-3beta,17beta-diol-16-one, it may be partially unsaturated as in 5-androsten-3beta-methoxy-17beta-ol-16-one or it may contain one or more aromatic rings as in 1,3,5(10)-estratrien-3,17beta-ol-16-one.

The compounds of this application, particularly 17beta-methoxy-5-androsten-3beta-ol-16-one, exhibit properties of stimulating the reticuloendothelial system of mammals, such as male mice, without significant toxic effects. Their action on the reticuloendothelial system is similar to that of the compounds of my application Serial No. 235,118, filed November 2, 1962. The compounds of this application are also useful as intermediates in the synthesis of the steroids disclosed in my Patent No. 2,994,708, granted August 1, 1961.

The invention is further illustrated by the following examples which are representative of procedures and compounds within the scope of this invention. It will be readily understood by those skilled in the art that modifications in conditions and equivalent materials may be made without departing from the invention as described herein.

EXAMPLE 1

*3beta,17beta-dimethoxy-5-androsten-16-one.*—A solution of 4.8 grams of 16-keto-5-androsten-3beta,16beta-diol-3-methyl ether (melting point 192–195° C.) in 500 ml. of methanol was refluxed while a solution of 10 grams of potassium hydroxide in 25 ml. of water were added. While the reflux was continued, two solutions were added simultaneously to the reaction mixture, one solution containing 220 grams of potassium hydroxide in 500 ml. of water and the second solution containing 320 ml. of dimethyl sulfate. The simultaneous addition of potassium hydroxide and dimethyl sulfate to the refluxing reaction mixture required 2½ hours. After the addition of reagents was completed about 200 ml. of methanol was distilled from the reaction mixture and the residue was cooled and treated with 3 liters of ice water and refrigerated at 0° C. The precipitate of 3beta,17beta-dimethoxy-5-androsten-16-one weighing 2.82 grams was removed by filtration and dried. It melted at 162–168° C. On further recrystallization from methanol with the aid of activated charcoal, large needles of 3beta,17beta-dimethoxy-5-androsten-16-one melting at 167–169° C. were obtained. The product had a rotation in chloroform of $[\alpha]_D^{23} = -227°$.

EXAMPLE 2

*17beta-methoxy-16-keto-5-androsten-3beta-ol.*—To a refluxing solution of 2.0 grams of 16-keto-5-androsten-3beta,17beta-diol (M.P. 206–207° C.) in 200 ml. of methanol were added simultaneously and pro rata 128 ml. of dimethyl sulfate a solution of 88 grams of potassium hydroxide in 200 ml. of water. The addition of potassium hydroxide and dimethyl sulfate required a period of about 2 hours. The reaction mixture was then cooled, diluted with 1800 ml. of ice water and refrigerated at 0° C. The precipitate of 17beta-methoxy-16-keto-5-androsten-3beta-ol was removed by filtration, washed with water and dried. On recrystallization from aqueous methanol with the aid of activated carbon, the product melted at 169–171° C.

EXAMPLE 2A

*17beta-methoxy-5-androsten-3beta,16beta-diol*, was produced from 17beta-methoxy-16-keto-5-androsten-3beta-ol by dissolving 700 mg. of the latter in 60 ml. of absolute ethanol and treating the solution at 0° C. with 0.5 gram of sodium borohydride over a period of 3 hours. The mixture was then brought to room temperature for 1 hour after which 700 ml. of cold 0.5% sodium chloride solution and 10 ml. of acetone were added. The reaction mixture was allowed to stand over night in the refrigerator at about 5° C. The precipitate of 17beta-methoxy-5-androsten-3beta,16beta-diol were removed by filtration and dried. It melted at 188–190° C. On recrystallization from aqueous methanol the product melted at 192–194° C.

EXAMPLE 3

*17beta-methoxy-androstan-3beta-ol-16-one.*—A solution of 3.0 grams of 16-ketoandrostan-3beta,17beta-diol (M.P. 182–195° C.) and 3.0 grams of potassium hydroxide in 120 ml. of methanol was refluxed and stirred while 192 ml. of dimethyl sulfate and a solution of 132 grams of potassium hydroxide in 300 ml. of water were added separately and simultaneously pro rata over a period of two hours. The reaction mixture was diluted with 3 liters of ice water and refrigerated at 0° C. The precipitate of 17beta-methoxyandrostan-3beta-ol-16-one was separated and recrystallized from a mixture of acetone and petroleum ether with the aid of activated carbon followed by recrystallization from aqueous methanol. The 17beta-methoxyandrostan-3beta-ol-16-one so obtained melted at 164–165° C.

EXAMPLE 4

*17beta - methoxy - 16 - keto-1,3,5(10)-estratrien-3-ol-3-benzyl ether.*—A solution of 1.82 grams of 16-keto-estradiol-3-benzyl ether in 1600 ml. of methanol was mixed with a solution of 6.7 grams of potassium hydroxide in 17 ml. of water. The resulting solution was refluxed and stirred while two solutions were added pro rata simultaneously. One solution contained 88 grams of potassium hydroxide in 250 ml. of water and the second was 127 ml. of dimethyl sulfate. The addition of dimethyl sulfate and potassium hydroxide solution was carried out over a period of 1½ hours and refluxing was continued for another 30 minutes. Then 1 liter of ice water was added and the mixture was cooled and refrigerated at 0° C. The precipitate of 17beta-methoxy-3-benzyloxy-1,3,5(10)-estratrien-16-one was removed by filtration, washed with water and dried. There was thus obtained 1.74 grams of product melting at 177–181° C.

1.47 grams of 17beta-methoxy-3-benzyloxy-1,3,5(10)-estratrien-16-one dissolved in 6 ml. of dry pyridine was treated with 1.5 grams of succinic anhydride. The mixture was heated on a steam bath for 2 hours and then diluted with 23 ml. of water and heated for ½ hour longer. The reaction mixture was cooled and partitioned between 300 ml. of 1 N hydrochloric acid and 750 ml. of ether. The ether solution was washed with 1 N hydrochloric acid, with water and with 0.1 N potassium carbonate solution containing 5% sodium chloride and finally twice with water. The ether solution was then evaporated to dryness and the residue was recrystallized from aqueous methanol with the aid of an activated carbon. There was thus obtained purified 17beta-methoxy-3-benzyloxy-1,3,5(10)-estratrien-16-one melting at 175–176° C.

EXAMPLE 5

*17beta - methoxy - 1,3,5(10) - estratrien-3-ol-16-one.*—To a solution of 4 grams of 16-ketoestradiol (I) and 2400 ml. of 0.5 N lithium hydroxide solution was added 32 ml. of dimethyl sulfate and the mixture was shaken for 30 minutes at room temperature. Then 28 ml. of additional dimethyl sulfate were added and the shaking continued for 30 minutes longer. Then the mixture was allowed to stand for about 15 hours at room temperature after which it was filtered to remove a precipitate of 16-ketoestradiol dimethyl ether. The filtrate was treated with solid carbon dioxide until the pH was reduced to 7.0–7.5 and then extracted with 2 liters of ether. The ether solution was washed with a liter of 3% sodium bicarbonate solution and with a liter of water. The ethereal solution was then evaporated to dryness on a steam bath and the residue of precipitate weighing 720 mg. was dried at 35° C. This product was 16-ketoestradiol-17-methyl ether (II). It was dissolved in 100 ml. of methanol, treated with activated charcoal, filtered and the filtrate evaporated until crystallization occurred. The crystals of 16-ketoestradiol-17-methyl ether (II) were collected on a filter, washed with 66% methanol at room temperature. On further recrystallization from 80% aqueous methanol, there were obtained crystals of 16-ketoestradiol-17-methyl ether melting at 271–272° C. (with decomposition).

EXAMPLE 6

16-ketoestradiol-3,17-dimethyl ether may be prepared by an alternative procedure starting with 16-ketoestradiol-3-methyl ether according to the following directions.

3 grams of 16-ketoestradiol-3-methyl ether dissolved in 500 ml. of methanol at reflux temperature was treated with a solution of 10 grams of potassium hydroxide and 25 ml. of water. The reaction mixture was agitated and refluxed while a solution of 132 grams of potassium hydroxide in 350 ml. of water was added simultaneously with 190 ml. of dimethyl sulfate over a period of 2.5 hours. The reaction mixture was cooled to room temperature and diluted with 4.5 liters of ice water. On standing over night a precipitate of 16-ketoestradiol-3,17-dimethyl ether formed. Upon recrystallization from 70% methanol, a yield of 185 grams of this product melting at 197.5–200° C. was obtained.

I claim:
1. 3β,17β-dimethoxy-5-androsten-16-one.
2. 17β-methoxy-5-androsten-3β,16β-diol.
3. 17β-methoxyandrostan-3β-ol-16-one.
4. 17β-methoxy-5-androsten-3β-ol-16-one.
5. 3β,17β-diloweralkoxy-5-androsten-16-one.
6. 17β-loweralkoxy-5-androsten-3β,16β-diol.
7. 17β-loweralkoxyandrostan-3β-ol-16-one.
8. 17β-loweralkoxy-5-androsten-3β-ol-16-one.

References Cited in the file of this patent

UNITED STATES PATENTS 2,949,476   Tyner _____ Aug. 16, 1960
2,994,708   Huffman _____ Aug. 1, 1961